United States Patent
Vasseur et al.

(10) Patent No.: US 7,359,386 B2
(45) Date of Patent: Apr. 15, 2008

(54) SOFT PREEMPTION FEEDBACK

(75) Inventors: Jean Philippe Vasseur, Dunstable, MA (US); Ramesh Uppili, Ottawa (CA); Carol Iturralde, Framingham, MA (US); Muthurajah Sivabalan, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 822 days.

(21) Appl. No.: 10/725,606

(22) Filed: Dec. 2, 2003

(65) Prior Publication Data

US 2005/0117512 A1    Jun. 2, 2005

(51) Int. Cl.
*H04L 12/28* (2006.01)
*H04L 12/54* (2006.01)

(52) U.S. Cl. .................. 370/395.5; 370/229; 370/230; 370/230.1; 370/231; 370/232; 370/233; 370/234; 370/410; 370/408; 370/412; 370/400; 370/392

(58) Field of Classification Search ............ None
See application file for complete search history.

(56) References Cited

U.S. PATENT DOCUMENTS

| 2002/0141345 A1 | 10/2002 | Szviatovszki et al. | |
| 2003/0067880 A1* | 4/2003 | Chiruvolu | 370/237 |
| 2003/0185217 A1* | 10/2003 | Ganti et al. | 370/395.5 |

OTHER PUBLICATIONS

Awduche et al., "Requirements for Traffic Engineering Over MPLS," RFC 2702, Internet Engineering Task Force, Sep. 1999.
Awduche et al., "RSVP-TE: Extensions to RSVP for LSP Tunnels," RFC 3209, Internet Engineering Task Force, Dec. 2001.
Berger et al., "Generalized MPLS Signaling—RSVP-TE Extensions," RFC 3473, Internet Engineering Task Force, Jan. 2003.
Braden et al., "Resource ReSerVation Protocol (RSVP)—Version 1 Functional Specification," RFC 2205, Internet Engineering Task Force, Sep. 1977.
Le Faucheur et al., "Requirements for Support of Diff-Serv-Aware MPLS Traffic Engineering," RFC 3564, Internet Engineering Task Force, Jul. 2003.
Meyer et al., "MPLS Traffic Engineering Soft Preemption," Internet Draft, Internet Engineering Task Force, Feb. 2003.
Pan et al., "Fast Reroute Extensions to RSVP-TE for LSP Tunnels," Internet Draft, Internet Engineering Task Force, Dec. 2003.
E. Rosen et al., Multiprotocol Label Switching Architecture, RFC 3031, Internet Engineering Task Force, Jan. 2001.
Vasseur et al., "Definition of an RRO Node-ID Subobject," Internet Draft, Internet Engineering Task Force, May 2003.

* cited by examiner

*Primary Examiner*—Chi Pham
*Assistant Examiner*—Raj K Jain
(74) *Attorney, Agent, or Firm*—Cindy Kaplan

(57) ABSTRACT

Systems and methods for preemption of Traffic Engineering LSPs such that preemption decisions are made in a coordinated fashion along the path of a new LSP and computation of a new path for a preempted LSP can take advantage of knowledge of newly unavailable links. The efficiency of the preemption mechanism is greatly increased and the undesirable effects of heterogeneous preemption decisions are limited. The amount of signaling may also be significantly reduced. In one implementation, these advantages are achieved by exploiting an upstream preemption feedback mechanism that uses an incremental timer to delay preemption decisions until feedback is available.

20 Claims, 3 Drawing Sheets

SOFT PREEMPTION FEEDBACK

BACKGROUND OF THE INVENTION

The present invention relates to data networking and more particularly, in certain embodiments, to systems and methods for preempting lower priority traffic.

MPLS (Multi-Protocol Label Switching) Traffic Engineering has been developed to meet data networking requirements such as guaranteed available bandwidth. MPLS Traffic Engineering exploits modern label switching techniques to build guaranteed bandwidth end-to-end tunnels through an IP network of labels switched routers (LSRs). These tunnels are a type of label switched path (LSP) and thus are generally referred to as MPLS Traffic Engineering LSPs.

MPLS Traffic Engineering LSPs traverse a series of nodes and links that interconnect them. To maintain the bandwidth guarantee, any given link can only accommodate MPLS Traffic Engineering LSPs having an aggregate bandwidth less than or equal to that link's advertised capacity. To better manage available bandwidth, MPLS Traffic Engineering LSPs may be assigned priority levels based on, e.g. their traffic type. For example, there may be eight priority levels with voice traffic being given a relatively high priority level. Priority levels may also be determined based on customer service level agreements (SLAs). Priorities may also be assigned based on the LSP size to increase the likelihood of finding a path.

A new traffic engineering LSP is established by way of signaling from the proposed LSP's head-end. Nodes along the proposed LSP's path will determine whether or not to admit or accept the proposed LSP based on available bandwidth on the link to the next node. It may be the case, however, that although there is insufficient unused bandwidth to accommodate the new LSP, some of the currently configured traffic is lower priority than the new LSP.

Existing implementations provide for hard preemption by default in such cases. The node that lacks sufficient bandwidth to accommodate a new higher priority Traffic Engineering LSP simply tears down one or more lower priority LSPs to free up sufficient bandwidth. Traffic on the preempted LSPs is disrupted until they are rerouted at their head-ends. Soft preemption algorithms have also been developed where the head-end is signaled before the preempted LSP is torn down by the preempting node. Although bandwidth limits may be temporarily exceeded under soft preemption, there is now time for the head-end to reroute the preempted LSP before traffic is disrupted.

The existing preemption techniques have drawbacks. Consider that preemption of lower priority LSPs may occur at multiple nodes along the path of a proposed new LSP. Some of the lower priority LSPs that are candidates for preemption may follow paths that overlap the path of the preempting LSP at more than one node. Each preempting node, however, independently determines which lower priority LSP(s) to preempt. The preemption algorithms and their inputs may however vary among the preempting nodes leading to inconsistent choices. Because each preempting node is unaware of the choices of the other preempting nodes, more bandwidth may be preempted than is necessary. Also, since a larger number of preempted LSPs than is necessary require rerouting, there is an undue signaling burden.

The distributed but uncoordinated nature of the preemption processes raises another difficulty. Multiple nodes along the path of a proposed LSP may preempt the same lower priority LSP. However, the head-end of the lower priority LSP may begin its reroute in reaction to the first indication of preemption. The computation of a new path will thus not take into account that in fact multiple nodes along the old path are now unavailable rather than the one node which first reported preemption. The head-end may then inadvertently attempt to reroute the path through congested nodes, resulting in rejection of the proposed reroute and further burdensome signaling to accomplish successful rerouting.

What is needed are systems and methods that address the above-mentioned drawbacks of current MPLS Traffic Engineering preemption techniques.

SUMMARY OF THE INVENTION

Embodiments of the present invention provide systems and methods for preemption of Traffic Engineering LSPs such that preemption decisions are made in a coordinated fashion along the path of a new LSP and computation of a new path for a preempted LSP can take advantage of knowledge of newly unavailable links. The efficiency of the preemption mechanism is greatly increased and the undesirable effects of heterogeneous preemption decisions are limited. The amount of signaling may also be significantly reduced. In one implementation, these advantages are achieved by exploiting an upstream preemption feedback mechanism that uses an incremental timer to delay preemption decisions until feedback is available.

One aspect of the present invention provides a method for operating a node in a label switched network. The method includes: receiving a request to establish a proposed label switched path through the node, determining that a bandwidth requirement of the proposed label switched path cannot currently be met, after receiving the request and prior to expiration of a time period, receiving information from one or more downstream nodes along the proposed label switched path identifying one or more currently configured label switched paths that have been preempted downstream, and after expiration of the time period, selecting one or more label switched paths to preempt from among currently configured label switched paths, the selecting being based at least in part on the received information.

Further understanding of the nature and advantages of the inventions herein may be realized by reference to the remaining portions of the specification and the attached drawings.

DESCRIPTION OF SPECIFIC EMBODIMENTS

Figure 1:
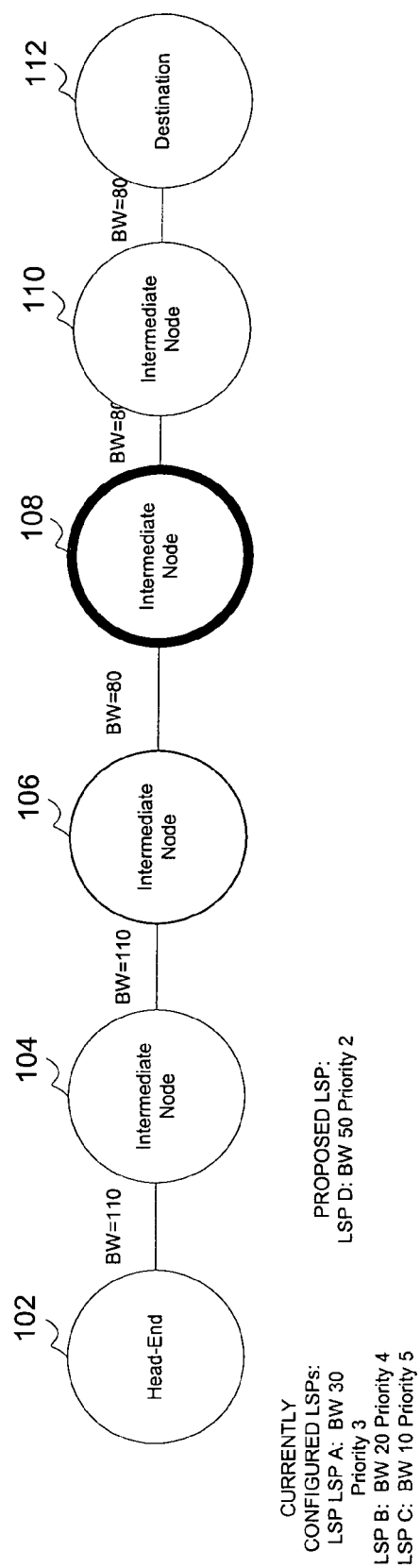
FIG. 1 depicts a representative preemption scenario according to one embodiment of the present invention.

The present invention will be described with reference to a representative network environment and employs a certain combination of network protocols to forward data through the network. The links may be implemented using any type of physical medium such as, e.g., an optical medium, wireless medium, twisted pair, etc. Links may also be logical connections that give the connected nodes the property of adjacency in view of the operative networking protocols.

In one embodiment, the nodes of such a network interoperate in a manner specified by various protocols including e.g., TCP/IP and protocols defined by the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Berger, et al., "Generalized MPLS Signaling—RSVP-TE Extensions," RFC 3473, Internet Engineering Task Force, January 2003.

Le Faucheur, et al., "Requirements for Support of DiffServ-Aware MPLS Traffic Engineering," RFC 3564, Internet Engineering Task Force, July 2003.

Awduche, et al., "RSVP-TE: Extensions to RSVP for LSP Tunnels," RFC 3209, Internet Engineering Task Force, December 2001.

Pan, et al., "Fast Reroute Extensions to RSVP-TE for LSP Tunnels," Internet Draft, Internet Engineering Task Force, expires December 2003.

Meyer, et al. "MPLS Traffic Engineering Soft Preemption," Internet Draft, Internet Engineering Task Force, February 2003.

Vasseur, et al., "Definition of an RRO node-ID subobject," Internet Draft, Internet Engineering Task Force, May 2003.

The contents of the above protocol documents are all herein incorporated by reference in their entirety for all purposes. Other suitable protocols known in the art may also be implemented by nodes of the example network.

In one embodiment, the nodes of the example network are IP routers that implement multiprotocol label switching (MPLS) and operate as label switched routers (LSRs). In one simple MPLS scenario, at the ingress to the network, a label is assigned to each incoming packet based on its forwarding equivalence class before forwarding the packet to the next hop node. At each intermediate node, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are preconfigured and referred to as label switched paths (LSPs). Establishment of an LSP requires computation of a path, signaling along the path, and modification of forwarding tables along the path.

MPLS Traffic Engineering establishes LSPs that have guaranteed bandwidth. Each MPLS Traffic Engineering LSP thus has a bandwidth requirement. Sufficient bandwidth is reserved on each link in the MPLS Traffic Engineering LSP to assure that the bandwidth guarantee is met. Bandwidth reserved on a link for one LSP is not available for other LSPs, except under certain circumstances. The total bandwidth reserved on a link should not exceed the link's advertised capacity.

Traffic Engineering LSPs may have different priorities depending on the type of traffic that they serve. In the scheme defined by the above-mentioned RFC 3209, there are eight priority levels, 0-7. Each LSP has a setup priority and a hold priority. The setup priority is used to decide whether a given LSP can preempt another LSP. The hold priority is used to determine whether a given LSP can be preempted by another LSP.

When a new LSP is proposed through a given node and there is insufficient bandwidth on the outbound link from that node, it may still be possible to accommodate the proposed LSP by preempting other traffic. FIG. 1 depicts a simple preemption scenario useful in illustrating embodiments of the present invention. A network fragment is depicted and includes six nodes: a head-end node 102, four intermediate nodes 104, 106, 108, and 110, and a destination node 112. In the scenario of FIG. 1, the link between head-end 102 and intermediate node 104 has a bandwidth of 110 units as does the link between intermediate node 104 and intermediate node 106. The links from intermediate node 106 through to destination node 112 all have a bandwidth of 80 units.

In this example, there are three currently configured LSPs that extend from head-end node 102 to destination node 112 through all four intermediate nodes. There is a LSP A with a bandwidth of 30 units and a priority level of three, an LSP B with a bandwidth of 20 units and a priority level of 4, and an LSP C with a bandwidth of 10 units and a priority level of 5. It can be seen then that the bandwidth between intermediate node 106 and destination node 112 is fully occupied while some bandwidth remains between head-end 102 and intermediate node 106. The present invention will be illustrated by an example where a new LSP D is proposed to be established.

Proposed LSP D has a bandwidth of 50 units and a priority level of 2 and would include the same nodes as the three currently configured LSPs. Head-end node 102 and intermediate node 104 can themselves accommodate the new LSP without displacing other traffic because their outbound links have sufficient remaining bandwidth. Intermediate nodes 106, 108, and 110, however do not have sufficient bandwidth on their outbound links and will have to preempt lower priority traffic in order to accommodate the new proposed LSP.

Figure 2:
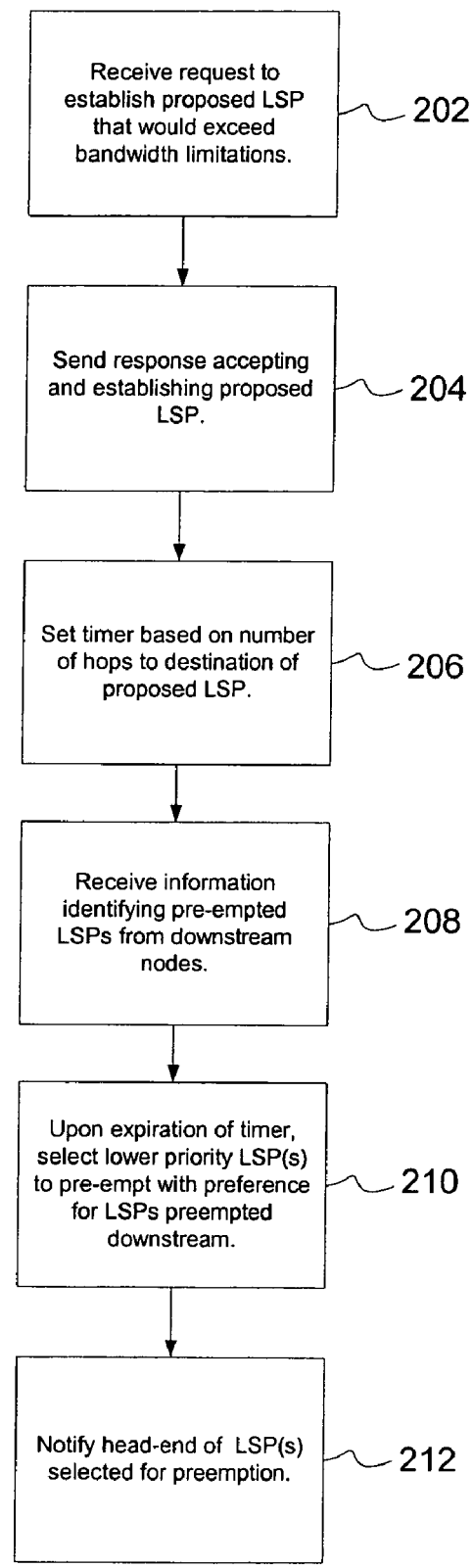
FIG. 2 is a flow chart describing steps of preemption of one or more currently configured LSPs to make room for a proposed LSP according to one embodiment of the present invention.

FIG. 2 is a flow chart describing steps of preempting lower priority traffic according to one embodiment of the present invention. FIG. 2 will be described from the perspective of the operation of intermediate node 108 in the example of FIG. 1. At step 202, intermediate node 108 receives a request to establish LSP D. The request typically comes in the form of an RSVP PATH message whose contents are specified by RFC 3209. The PATH message flows downstream over the proposed route. The request specifies the needed bandwidth.

Intermediate node 108 is currently carrying traffic totaling 60 units on its outbound link to intermediate node 110 and is now being asked to accommodate another 50 bandwidth units. Since the capacity on this outbound link is only 80, 30 bandwidth units of other traffic will have to be preempted to accommodate the new LSP. This will be possible because the new proposed LSP D has a priority level of two which is higher priority than any of the currently configured LSPs.

At step 204, intermediate node 108 sends a response upstream towards head-end 102 accepting and establishing the proposed LSP. A response takes the form of an RSVP RESV message that includes a label to be used by the previous intermediate node 106 in forwarding traffic for the new LSP. The RESV message contents are specified by RFC 3209. It will be appreciated that the new LSP is being signaled even though the bandwidth to accommodate it is not yet available as preemption has not yet taken place. This is done to avoid delay in the signaling of the new LSP.

At step 206, a timer is initialized and started to define a duration during which intermediate node 108 can learn of preemption decisions made downstream along the proposed LSP. The timer value is set proportionately to the number of hops on the way to the proposed LSP destination. Here there are two hops between destination node 112 and intermediate node 108. The number of hops may be evaluated by analyzing the number of RRO (Record Route) node-id sub-objects in the PATH message establishing the proposed LSP. The node-id sub-objects are described in the above-cited Internet Draft entitled "Definition of an RRO node-ID subobject." Alternatively, the number of hops can be determined based on knowledge of the IP address of destination node 112 as found in the PATH message and knowledge of network topology as would be found in a database maintained by the locally operative Interior Gateway Protocol (IGP). The time interval by which to multiply the number of hops may be determined empirically.

While the timer is counting down, at step 208, intermediate node 108 receives information identifying which LSPs have been preempted by downstream nodes. In this particular simple example, the only downstream node is intermediate node 110. The information is included in an RSVP RESV message that flows upstream. In particular, included within such an RESV message is an RRO subobject identifying the preempted LSP Within this RRO subobject, there is a preemption pending flag provided by the present invention. This flag is set to indicate preemption of the LSP. A single RESV message flowing upstream towards head-end 102 may accumulate multiple RRO sub-objects giving preemption information for multiple intermediate nodes.

At step 210 the timer set at step 206 expires. Now intermediate node 108 can decide which lower priority LSP(s) to preempt to make room for proposed LSP D. One possible preemption algorithm would be to begin with the lowest priority currently configured LSP, select that one for preemption and continue up the list of currently configured LSPs in order of priority until enough bandwidth is accumulated. In the present example, this would result in the selection of LSP B and LSP C for preemption. Another possible preemption selection algorithm selects the smallest number of lower priority LSPs to preempt. This would result in the selection of LSP A for preemption. These are just two examples of possible preemption selection algorithms.

Absent application of the present invention, intermediate nodes 106, 108, and 110 may make different selections due to the use of different algorithms. This may be because node equipment is provided by different vendors. In more complex examples, where there are a variety of LSP routes, different preemption selections result from varying choices of lower priority LSPs to preempt.

According to the present invention, however, intermediate node 108 takes into account the preemption decisions of downstream nodes. In this simple example, there are only two possible preemption decisions. Intermediate node 108 can select either LSP A or a combination of LSP B and LSP C for preemption. In accordance with embodiments of the present invention, intermediate node 108 makes the same selection as intermediate node 110 regardless of the locally operative selection algorithm. Then if more LSPs must be preempted to accommodate the proposed LSPs, the intermediate node triggers its locally operative preemption algorithm.

It will be appreciated that there are much more complex preemption situations with larger numbers of downstream intermediate nodes and more variation in the configurations of LSPs among these nodes. In accordance with embodiments of the present invention, a given node may take into account the selections of downstream nodes in making its preemption decision so as to minimize preempted traffic. For example, the preempting node first selects for preemption all of the LSPs that use the affected link and have already been preempted by downstream nodes. Then the locally operative preemption selection algorithm harvests any remaining needed bandwidth.

At step 212, intermediate node 108 notifies head-end 102 of its preemption selection(s). Intermediate node 108 notifies by employing an RRO sub-object or sub-objects identifying any preempted LSPs. The RROs are included in an RESV message sent upstream. The previously mentioned preemption flags are set. The RROs indicating the preemption decision of intermediate node 108 may be included in an RESV message that propagates upstream accumulating the preemption decisions of the intermediate nodes along the way.

Once head-end 102 receives the preemption information, it attempts to reroute the preempted LSPs. Head-end 102 deletes the preempting links from its route topology database before computing new paths. This greatly increases the likelihood that the new paths will be accepted since they will not attempt to use links that are already congested.

It will be seen then that embodiments of the present invention provide for coordination of distributed preemption decisions. This reduces the number of LSPs and/or volume of traffic that need to be preempted to accommodate a given level of higher priority traffic. Since fewer LSPs are preempted, signaling associated with rerouting is reduced. Since the head-end is aware of all nodes that have preempted a particular LSP due to congestion, the rerouted path will omit these links and be less likely to be refused and rerouted yet again, thus providing further economy in signaling.

Figure 3:
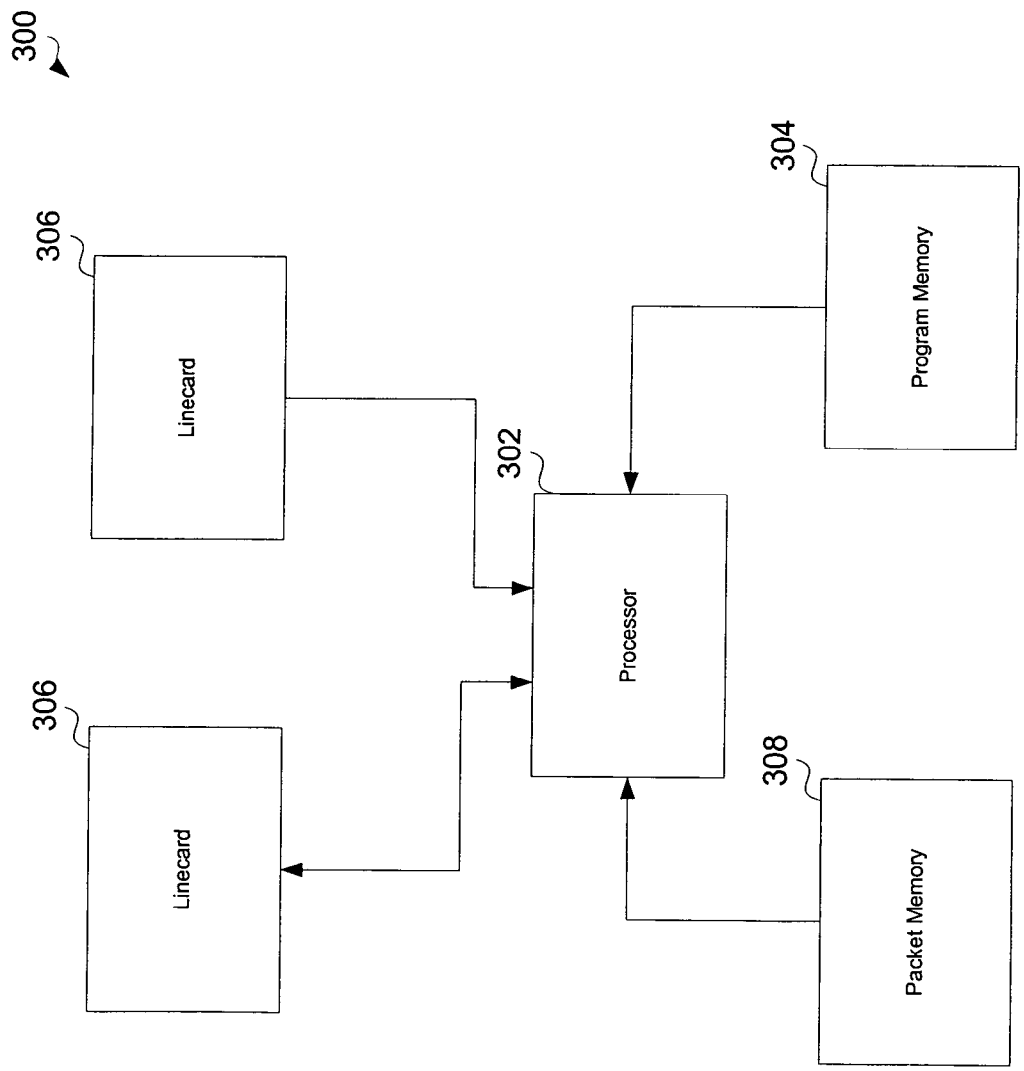
FIG. 3 depicts a network device useful in implementing embodiments of the present invention.

FIG. 3 depicts a network device 300 that may be used to implement, e.g., any of the nodes of FIG. 1 and/or perform any of the steps of FIG. 2. In one embodiment, network device 300 is a programmable machine that may be implemented in hardware, software or any combination thereof. A processor 302 executes code stored in a program memory 304. Program memory 304 is one example of a computer-readable medium. Program memory 304 can be a volatile memory. Another form of computer-readable medium storing the same codes would be some type of non-volatile storage such as floppy disks, CD-ROMs, DVD-ROMs, hard disks, flash memory, etc. A carrier wave that carries the code across a network is another example of a computer-readable medium.

Network device 300 interfaces with physical media via a plurality of linecards 306. Linecards 306 may incorporate Ethernet interfaces, DSL interfaces, Gigabit Ethernet interfaces, 10-Gigabit Ethernet interfaces, SONET interfaces, etc. As packets are received, processed, and forwarded by network device 300, they may be stored in a packet memory 308. Network device 300 implements all of the network protocols and extensions thereof described above as well as the data networking features provided by the present invention.

In one implementation, control plane operations such as the LSP admission and preemption operations described above are controlled and signaled by processor 302 while forwarding tables are maintained on linecards 306. The present invention is, however, not limited to a distributed architecture. Packet forwarding operations may occur partially or completely within one of linecards 306 or be divided between the ingress and egress linecards encountered by a particular packet. To implement functionality according to the present invention, linecards 306 may incorporate processing and memory resources similar to those discussed above in connection with the network device as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a node in a label switched network, said method comprising:
   - receiving a request to establish a proposed label switched path through said node;
   - determining that a bandwidth requirement of said proposed label switched path cannot currently be met;
   - after receiving said request and prior to expiration of a time period, receiving information from one or more downstream nodes along said proposed label switched path identifying one or more currently configured label switched paths that have been preempted downstream; and
   - after expiration of said time period, selecting one or more label switched paths to preempt from among currently configured label switched paths, said selecting being based at least in part on said received information.

2. The method of claim 1 further comprising:
   - determining said time period responsive to a number of hops between said node and a destination of said proposed label switched path.

3. The method of claim 1 further comprising:
   - sending a message indicating acceptance of said proposed label switched path prior to expiration of said time period.

4. The method of claim 1 wherein said selecting favors local preemption of said currently configured label switched paths that have been preempted downstream.

5. The method of claim 1 wherein said one or more label switched paths selected for preemption have a lower priority than said proposed label switched path.

6. A computer readable medium encoded with a computer program for operating a node in a label switched network, said computer program comprising: code that receives a request to establish a proposed label switched path through said node;
   - code that determines that a bandwidth requirement of said proposed label switched path cannot currently be met;
   - code that, after receiving said request and prior to expiration of a time period, receives information from one or more downstream nodes along said proposed label switched path identifying one or more currently configured label switched paths that have been preempted downstream; and
   - code that, after expiration of said time period, selects one or more label switched paths to preempt from among currently configured label switched paths, said selecting being based at least in part on said received information.

7. The computer program of claim 6 further comprising:
   - code that determines said time period responsive to a number of hops between said node and a destination of said proposed label switched path.

8. The computer program of claim 6 further comprising:
   - code that sends a message indicating acceptance of said proposed label switched path prior to expiration of said time period.

9. The computer program of claim 6 wherein said code that selects favors local preemption of said currently configured label switched paths that have been preempted downstream.

10. The computer program of claim 6 wherein said one or more label switched paths selected for preemption have a lower priority than said proposed label switched path.

11. Apparatus for operating a node in a label switched network, said apparatus comprising:
    - means for receiving a request to establish a proposed label switched path through said node;
    - means for determining that a bandwidth requirement of said proposed label switched path cannot currently be met;
    - means for, after receiving said request and prior to expiration of a time period, receiving information from one or more downstream nodes along said proposed label switched path identifying one or more currently configured label switched paths that have been preempted downstream; and
    - means for, after expiration of said time period, selecting one or more label switched paths to preempt from among currently configured label switched paths, said selecting being based at least in part on said received information.

12. The apparatus of claim 11 further comprising:
    - means for determining said time period responsive to a number of hops between said node and a destination of said proposed label switched path.

13. The apparatus of claim 11 further comprising:
    - means for sending a message indicating acceptance of said proposed label switched path prior to expiration of said time period.

14. The apparatus of claim 11 wherein said means for selecting favors local preemption of said currently configured label switched paths that have been preempted downstream.

15. The apparatus of claim 11 wherein said one or more label switched paths selected for preemption have a lower priority than said proposed label switched path.

16. Apparatus for operating a node in a label switched network, said apparatus comprising:
    - a processor; and
    - a memory device storing instructions for execution by said processor, said instructions comprising:
      - code that receives a request to establish a proposed label switched path through said node;
      - code that determines that a bandwidth requirement of said proposed label switched path cannot currently be met;
      - code that, after receiving said request and prior to expiration of a time period, receives information from one or more downstream nodes along said proposed label switched path identifying one or more currently configured label switched paths that have been preempted downstream; and
      - code that, after expiration of said time period, selects one or more label switched paths to preempt from among currently configured label switched paths, said selecting being based at least in part on said received information.

17. The apparatus of claim 16 wherein said instructions further comprise:

code that determines said time period responsive to a number of hops between said node and a destination of said proposed label switched path.

18. The apparatus of claim 16 wherein said instructions further comprise:
code that sends a message indicating acceptance of said proposed label switched path prior to expiration of said time period.

19. The apparatus of claim 16 wherein said code that selects favors local preemption of said currently configured label switched paths that have been preempted downstream.

20. The apparatus of claim 16 wherein said one or more label switched paths selected for preemption have a lower priority than said proposed label switched path.

* * * * *